United States Patent [19]

Bliss

[11] Patent Number: 4,818,634
[45] Date of Patent: Apr. 4, 1989

[54] COMPOSITE METAL SPRING MATERIAL, METHOD OF MAKING, AND SPRING MEMBERS FORMED THEREFROM

[75] Inventor: Thomas Bliss, Mattapoisett, Mass.

[73] Assignee: Texas Instruments Incorporated, Dallas, Tex.

[21] Appl. No.: 946,414

[22] Filed: Dec. 24, 1986

[51] Int. Cl.⁴ .................. B32B 15/18; B32B 15/20; C22F 1/08; C21D 9/02

[52] U.S. Cl. .................................... 428/677; 428/685; 428/929; 428/931; 148/326; 148/432; 148/908

[58] Field of Search ............... 428/677, 929, 685, 931; 148/11.5 Q, 908, 326, 432; 339/276 C; 200/266

[56] References Cited

U.S. PATENT DOCUMENTS

| | | | |
|---|---|---|---|
| 2,476,886 | 7/1949 | Miller et al. | 428/929 |
| 2,558,093 | 6/1951 | Kinney | 428/929 |
| 2,718,690 | 9/1955 | Ulam | 428/677 |
| 2,740,735 | 4/1956 | Swain | 148/11.5 Q |
| 3,134,701 | 5/1964 | Evans et al. | 148/11.5 Q |
| 3,251,660 | 5/1966 | Finsterwalder | 428/677 |
| 3,298,803 | 1/1967 | Ulam | 428/677 |
| 3,405,228 | 10/1968 | Polizzamo | 428/677 |
| 3,555,169 | 1/1971 | Miller | 428/677 |
| 3,698,963 | 10/1972 | Nunes et al. | 428/677 |
| 3,837,818 | 9/1974 | Happ et al. | 428/677 |
| 4,525,434 | 6/1985 | Morikawa et al. | 428/929 |

*Primary Examiner*—John J. Zimmerman
*Attorney, Agent, or Firm*—James P. McAndrews; John A. Haug; Melvin Sharp

[57] ABSTRACT

A composite metal spring material, and formed electrically conductive contact spring members made from the material, comprise metallurgically bonded layers of copper and stainless steel of selected compositions which are subjected to a novel sequence of heat-treating steps for providing the spring materials and members with spring characteristics of improved strength and stability.

3 Claims, 2 Drawing Sheets

COMPOSITE METAL SPRING MATERIAL, METHOD OF MAKING, AND SPRING MEMBERS FORMED THEREFROM

BACKGROUND OF THE INVENTION

The field of this invention is that of electrically conductive spring materials and members and of methods for making such spring materials and members.

Electrically conductive spring materials and members used in making electrically conductive spring contacts in switches and in sockets for mounting integrated circuits on printed circuit boards and the like are presently made from a variety of electrically conductive metal materials such as beryllium copper, phosphor bronze, cupro nickels, nickel silver and copper-clad steels including copper-clad stainless steels. The electrically conductive spring materials used in specific switch and socket applications are usually selected for meeting various performance specifications for specific applications while also achieving the desired performance at the lowest overall cost taking into account not only the basic material cost but also the costs involved in manufacturing and assembling electrically conductive spring members made from the selected materials. In that selection process, it is typically found that berylium copper materials are required for meeting the higher performance specifications and such materials are widely used even though the basic material costs are high and even though the spring members which use such materials are difficult and expensive to form. Typically beryllium copper materials have limited formability properties making them difficult to bend into desired contact member shapes and those materials require special heat-treatments and the like after forming to provide shaped spring members with their intended spring characteristics for meeting the high performance specifications. Typically copper-clad steel spring materials have been available at relatively much lower cost but have not had performance characteristics suitable for meeting the requirements of many high performance electrically conductive spring applications.

BRIEF SUMMARY OF THE INVENTION

It is an object of this invention to provide a novel and improved electrically conductive spring material; to provide such a material which is adapted to achieve substantially improved spring and electrical conductivity characteristics at substantially reduced cost; to provide such a material which has performance characteristics permitting its use at lower cost in those electrically conductive spring applications which presently require use of beryllium copper spring materials and the like; to provide such improved spring materials which also have cost characteristics permitting use of the materials to achieve improved performance in other applications where cost considerations presently dictate use of low cost but lower performance, conventional spring materials; to provide electrically conductive spring members made from such new materials; and to provide novel and improved methods for making such new spring materials and members.

In that regard, it is found that when electrically conductive contact spring members are made from conventional combinations of copper and stainless steel by conventional processes, the contact forces provided by the members are lower than desired for certain applications. This is attributable in part to the basic characteristics of the copper and stainless steel materials conventionally used in such conductive spring materials but it is also found that this limitation in spring force characteristics is due to some extent at least in that, when the spring materials are subjected to elevated temperatures, they display a significant decline in contact force due to stress relaxation during use. Accordingly, where the conductive spring materials have a desired thickness of copper material to meet desired electrical conductivity requirements, the copper-clad stainless steel materials provide insufficient strength and stability for use in the high performance spring applications.

In the present invention it is found that where the stainless steels used in copper-clad, composite metal laminate spring materials are selected in accordance with new criteria and are processed in a novel way, novel spring materials are achieved which display improved strength and stability in applications where low cost copper-clad stainless steels had previously been used and which are adapted for use in applications which had previously required use of more expensive beryllium copper material. Where such composite metal laminates are formed with metallurgical bonding between the layers by pressure roll bonding or the like, selected age or precipitation hardenable copper materials can be used and can be solution annealed in a desired manner during a heat-treatment which also serves to process and solution anneal the metallurgically bonded stainless steel materials in the laminates. The initially bonded materials of the laminate are subjected to selected additional pressure rolling reduction in the thickness thereof to provide the metal laminate with desired initial spring characteristics and are then subjected to an additional heat-treatment which not only serves to thermally stress relieve the selected stainless steel materials in the laminate in a novel way but also to age and precipitation harden the selected copper alloys in the laminate.

In that way, the electrically conductive composite metal spring materials of this invention are easily and inexpensively provided with improved spring and electrical conductivity properties. The spring materials have desirable formability properties for permitting easy and inexpensive shaping of spring members from the materials. The spring members display substantially improved spring characteristics including substantially improved stability of those characteristics over a long service life without requiring any additional heat-treating of the members after they are formed. As a result, spring materials of this invention provide improved performance with respect to previously known spring materials of comparable cost and, in preferred embodiments, provide performance characteristics which make the new materials of this invention suitable for significantly lower cost application where beryllium copper materials have previously been required for performance purposes.

DESCRIPTION OF THE DRAWINGS

Other objects, advantages and details of the novel and improved spring materials, members and methods of this invention appear in the following detailed description of the preferred embodiments of the invention in which.

DESCRIPTION OF THE PREFERRED EMBODIMENTS

Figure 1:
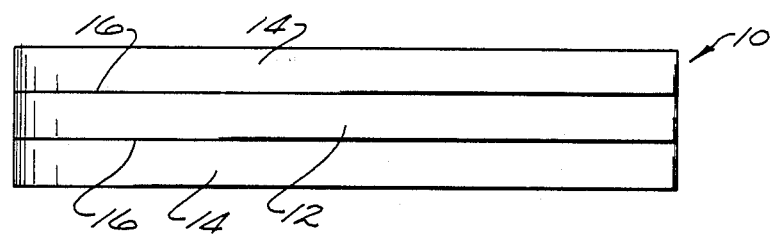
FIG. 1 is a side elevation view of an electrically conductive composite metal spring material of this invention.

Referring to the drawings, 10 in FIG. 1 indicates a preferred embodiment of the novel and improved electrically conductive composite metal spring material of this invention which is shown to comprise a metal laminate having a core layer 12 of stainless steel metallurgically bonded to a pair of outer metal cladding layers 14 of a copper material along interfaces 16 between the metal layers. Preferably, the composite metal laminate material 10 is formed by pressure roll bonding with reduction in the thickness of the metal materials being bonded together as is diagrammatically illustrated by feeding of the noted materials from payoff reels 18 between the pressure bonding rolls 20 in FIG. 2. As such pressure roll bonding is well known, as shown in U.S. Pat. Nos. 2,691,815 and 2,753,623 for example, the general features of the pressure roll bonding step are not further described herein and it will be understood that any conventional pressure roll bonding process is used to establish a metallurgical bond between metal layers of the laminate. It should be understood that although the metal laminate 10 as illustrated in FIG. 1 comprises a symmetrical three layer metal laminate having layers 14 of substantially equal thickness so that the laminate material is not adapted to flex when subjected to temperature change, a laminate material having two or any other desired number of metal layers of copper and stainless steel materials metallurgically bonded together in any sequence is within the scope of this invention. As will be understood, such bonding is typically achieved by conventional pressure roll bonding with reduction in thickness of the laminate layer materials in the range from 50 to 75% of the original thickness of the laminate materials and the relative thickness of the laminate layers is selected to provide the resulting composite spring material with desired spring characteristics and with a desired electrical conductivity, preferably in the range from 20 to 40% of the conventional copper conductor standard (I.A.C.S.).

In preferred embodiments of the invention, the materials of the stainless steel layers of the laminate are selected from commercially available stainless steel alloys having nominal compositions by weight percent as shown in Table I:

TABLE I

| MAT. DESIG.[1] | CARBON Max. | MANGANESE Max. | SILICON Max. | COMPOSITION PHOSPH'S Max. | SULFUR Max. | CHROMIUM | NICKEL | OTHER | IRON |
|---|---|---|---|---|---|---|---|---|---|
| 301[2] | 0.15 | 2.00 | 1.00 | 0.060 | 0.030 | 17.5–17.8 | 7.5–7.8 | — | Bal. |
| 311DQ[3] | 0.04 | 2.50 | 0.50 | — | — | 17.25 | 4.5 | 2.4 copper | Bal. |
| 17-7PH | 0.09 | 1.00 | 1.00 | 0.040 | 0.030 | 16.0–18.0 | 6.50–7.75 | 0.75–1.50 aluminum | Bal. |

[1] Designation of American Iron and Steel Institute
[2] Preferred material composition selected from among those commercially available
[3] Product of Armco Steel Corporation In accordance with this invention, the materials of the copper metal layers are formed of OFHC or other conventional copper materials but are preferably formed of age or precipitation hardenable alloys of generally conventional type. Preferably for example the copper materials are selected from the group of high conductivity copper materials and from age and precipitation hardenable alloys having nominal compositions by weight percent as set forth in Table II:

TABLE II

| MAT. DESIG. | COPPER (+SILVER) | SILVER | PHOSPHOROUS | COMPOSITION ZIRCONIUM | IRON | ZINC | ALUMINUM | MAGNESIUM | OTHER |
|---|---|---|---|---|---|---|---|---|---|
| 151[5] | Bal. | — | — | .05–.15 max. | .005 max. | — | 0.005 max. | .005 Aluminum- | Iron Manganese Max. .01 |
| 155[5] | 99.75 Min. Copper−Silver[6] | .027–.10 | .040–.080 | — | — | — | — | .80–.130 | — |
| 192105 | Bal. | — | .025–.040 | — | .05–.15 | — | — | — | — |
| Zirconium[7] Oxygen Free | Bal. | — | — | .025–.15 | — | — | — | — | — |
| Iron[8] Copper | Bal. | — | .03 | — | .07 | .05 | — | — | — |
| 101[5] | 99.995 | — | — | — | — | — | — | — | .05 Max. |

Figure 2:
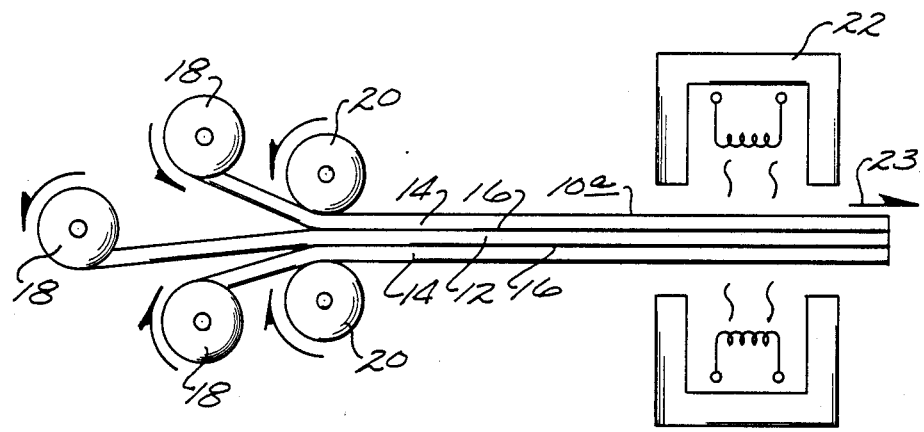
FIG. 2 is a diagrammatic view illustrating steps in the method of this invention for making the spring material of FIG. 1.

[5] Designation of Copper Development Association
[6] 0.027–0.101 silver
[7] Product of Hitachi Corporation
[8] Product of In accordance with the method of this invention, the composite metal laminate 10 in as-bonded condition as indicated at 10a in FIG. 2 is preferably subjected to a first heat-treatment for process annealing and for full solutionizing of iron carbides and the like in the stainless steel materials as is diagrammatically illustrated by the heating oven 22 in FIG. 2. Where the as-bonded metal laminate incorporates age and precipitation hardenable copper alloys as noted above, this first heat-treatment step is preferably regulated for also performing desired solutionizing of the copper materials such that the alloys of the copper materials in the laminate are in a substantially homogeneous condition following the first heat-treatment step.

For example, where the metal laminate material comprises a core layer 12 of 301 or 311DQ Stainless Steel and a pair 101 Copper cladding layers 14, the as-bonded laminate material is preferably heated to a temperature from 1850° to 2050° F., and preferably at 1900° to 1950° F., for a period of one to three minutes, typically but not necessarily in a cracked ammonia atmosphere or the like and preferably by conventional, continuous strip annealing or the like, such heat-treating serving to process anneal the copper and to process anneal and fully solutionize the stainless steel materials of the laminate.

Similarly, where the metal laminate materials comprise any of the stainless steel materials of Table I and a pair of copper layers of age or precipitation hardenable materials of Table II, the as-bonded laminate material is preferably heated to a temperature 1850° to 2050° F. for a period of one to three minutes in a cracked ammonia atmosphere or the like, preferably by conventional strip annealing or the like for not only process annealing and fully solutionizing the stainless steel materials of the laminate but also for process annealing and fully solutionizing the age and precipitation hardenable copper materials of the laminate. In that first heat-treatment step, the laminate material is advanced through the conventional strip annealing equipment with relative low drawing forces as is diagrammatically indicated by the arrow 23 in FIG. 1 for substantially avoiding material stretching such as might lead to development of stress induced martensite in the stainless steel materials of the laminate.

Figure 3:
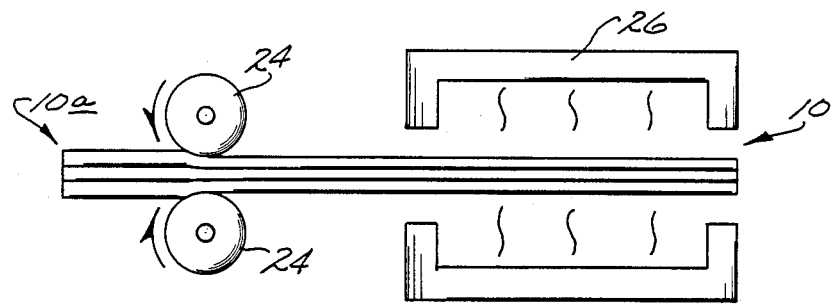
FIG. 3 is diagrammatic view illustrating other steps in the method of this invention for forming the spring material of FIG. 1.

In accordance with the preferred method of this invention, the composite metal laminate 10a as thus far described is then subjected to temper rolling as is diagrammatically illustrated by the pressure reducing rolls 24 in FIG. 3 to selectively work-harden the laminate for providing the laminate with desired resilience or temper to serve as an electrically conductive spring material. Typically for example the laminate is provided with a reduction in thickness in the range from 25 to 50% for spring temper purposes, and in preferred embodiments of the invention the temper rolling reduces the thickness of the laminate in the range from about 30 to 40% of the original composite laminate thickness. Again, the laminate material is advanced through such temper rolling with relatively low drawing forces and at relatively low speeds for substantially avoiding stretching and material heating such as might result in nonuniform development of stress induced martensite and the like in the stainless steel materials.

In accordance with the method of this invention, the tempered metal laminate as thus far described is then subjected to a second heat-treatment step for thermally stress relieving the materials of the stainless steel layer or layers of the laminate in a controlled manner as is diagrammatically illustrated by reference to the heating oven 26 in FIG. 3. Where the metal laminate incorporates age and precipitation hardenable copper alloys as noted above, the second heat-treatment step is preferably regulated for also age and precipitation hardening the copper materials of the laminate.

For example, where the metal laminate material comprises a core layer 12 of 301 or 311DQ Stainless Steel and a pair of 101 Copper cladding layers 14 temper rolled as above described, the laminate is preferably heated in the second heat-treatment step in a temperature range from 500° to 1000° F. for a period of 4 to 24 hours in a nitrogen/cracked ammonia atmosphere in a conventional bell annealing furnace or the like for thermally stress relieving the stainless steel materials of the laminate in a controlled manner. Similarly, where the metal laminate materials comprise any of the stainless steel materials from Table I and a pair of copper alloys of age and precipitation hardenable materials of Table II, the laminate materials are preferably heated to a temperature in the range from 500° to 1000° F. for a period of 4 to 24 hours in an atmosphere of nitrogen/cracked ammonia or the like, preferably in a conventional bell annealing furnace, for not only thermally stress relieving the stainless steel materials of the laminate but also for substantially fully age and precipitation hardening the copper materials of the laminate.

In this invention, the second heat-treatment step when used in the manner described above is found to achieve an initial controlled degree of thermal stress relief in the temper rolled spring material such that a substantial proportion of the stress remains in the spring materials when the spring materials are placed or used and such that they undergo further stress relaxation thereafter to only a limited extent and at a relatively slow rate. Accordingly the spring materials display substantially improved initial spring strength and contact force and improved stability in those performance characteristics such that they can be successfully used in spring applications having substantially higher performance requirements than have previously been possible with comparable materials.

Figure 5:
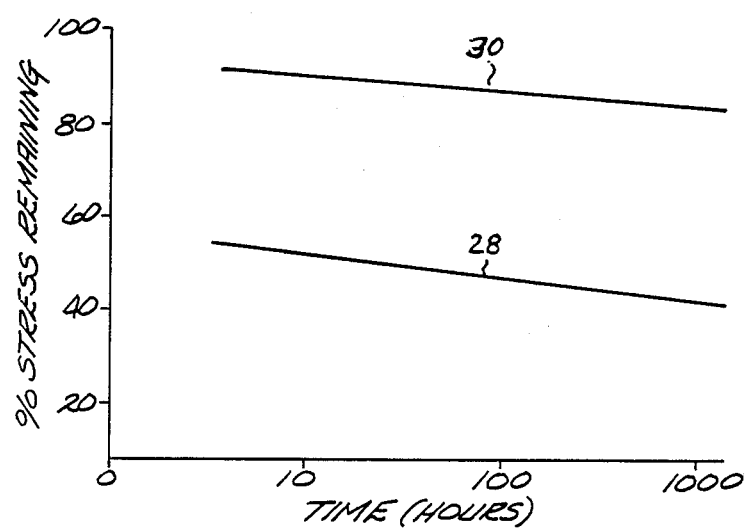
FIG. 5 is a graph indicating spring characteristics of the spring materials of this invention.

For example, where two comparison samples of copper/stainless steel/copper composite metal laminate materials were metallurgically bonded together to have relative layer thicknesses of 12.5%/75%/12.5% respectively, were subjected to the exemplary first heat-treatment step as described above, were temper rolled with reductions in thickness of 30% and 40% respectively, and were subjected to use testing at an elevated temperature of 200° C. for 1000 hours, it was found that each of the sample materials underwent a sharp, initial decline in the amount of stress remaining in the temper rolled materials after only a few hours as indicated by curve 28 in FIG. 5 representing an average of the two samples tested. The sample materials then underwent continuing decline in the amount of stress remaining in the temper rolled material at a significant rate substantially throughout the 1000 hour test period. Accordingly the sample materials displayed relatively low strength and spring contact forces and were characterized by relatively poor stability such that they would be useful only for spring applications having relatively low spring performance requirements.

Example A

However, where two comparable sample materials were bonded, were subjected to the first heat-treatment step, were temper rolled to 30% and 40% thickness reductions respectively, and were then subjected to the exemplary second heat-treatment step in accordance with this invention as described above, the resulting controlled thermal stress relief of the temper rolled materials provided novel and improved spring materials which undergo relatively much smaller decline in the mount of stress remaining in the materials and which display significantly improved stability in the amount of stress remaining over a long service life as is indicated by curve 30 in FIG. 5 representing an average of the two samples tested. That is, the improved materials of the invention undergo a substantially smaller initial decline in stress remaining in the temper rolled spring materials and undergo subsequent decline in remaining stress only at a relatively much slower rate. As a result the materials of this invention are adapted to display greater strength and contact forces in use and to display substantially greater stability of those characteristics over a long service life such that the materials are adapted for use in applications having higher performance requirements than comparable previously known materials. The two sample materials tested provided substantially the same stress-remaining curve indicating that the desirable properties are achieved substantially independent of the degree of temper rolling provided in the materials.

Similarly desirable results are achieved with other preferred embodiments of this invention as set out in exemplary composite metal laminate spring materials 10 in Table III, the laminates being bonded and subjected to the first and second exemplary heat-treatment steps as described above as tested as set forth in Table III as follows:

contact members. Further, the methods of this invention are adapted to process those selected stainless steel materials for achieving the desired strain hardening and dispersion strengthening in a controlled and repeatable manner at reasonable cost.

For example, it is believed the use of 301 Stainless Steel having the preferred chromium and nickel contents as specified in Table I permits a laminate embodying that material to be processed through the first heat treating step as above described to be substantially free of stress induced martensite and then to be subjected to a desired temper rolling and second heat treatment as described which not only thermally stress relieves the stainless steel for stabilizing its spring properties but also induces a desired limited degree of uniformly distributed martensite throughout the stainless steel for stabilizing the material at an improved high spring strength level. Where a stainless steel alloy of greater chromium and nickel content is used, insufficient martensite formation may occur to permit use of the laminate material in such high temperature spring application on the order of 200° C. On the other hand, where lower chromium or nickel contents are used, the martensite formation may be difficult to control and result in material of inadequate formability for use in electrically conductive spring applications in electronic circuit connectors and the like. Similarly, the use of the 311DQ and 17-7PH Stainless Steel materials are also adapted to permit controlled strain hardening and dispersion strengthening in accordance with this invention. Further, the process steps of this invention are also compatible with fully

TABLE III

| Ex. | LAYER MATERIAL % THK. CU 14 | LAYER MATERIAL % THK. SS 12 | LAYER MATERIAL % THK. CU 14 | COND. (% IACS) | COLD WORK % | TENS. STR. Kpsi | YIELD STR. Kpsi | MODULUS TENS. (10⁶) | MODULUS BEND (10⁶) | STRESS REMAINING (% AFTER 1000 HR.) 150° C. | STRESS REMAINING (% AFTER 1000 HR.) 200° C. | STRESS REMAINING (% AFTER 1000 HR.) 250° C. |
|---|---|---|---|---|---|---|---|---|---|---|---|---|
| B | 101 (12.5) | 301* (75) | 101 (12.5) | 22 | 30 | 145[1] | 139[1] | 25.6 | 20.0 | 78 | 68 | 62 |
| C | 101 (12.5) | 301* (75) | 101 (12.5) | 22 | 35 | 149[1] | 142[1] | 24.7 | 20.0 | 78 | 68 | 62 |
| D | 101 (12.5) | 301* (75) | 101 (12.5) | 22 | 40 | 156[1] | 150[1] | 25.5 | 20.4 | 78 | 68 | 62 |
| E | 101 (20) | 301* (60) | 101 (20) | | 30 | 119[2] | 109[2] | 20.0 | — | 52 | 45 | 26 |
| F | 101 (20) | 301* (60) | 101 (20) | | 35 | 127[2] | 115[2] | 22.0 | — | | | |
| G | 101 (20) | 301* (60) | 101 (20) | | 40 | 137[2] | 120[2] | 22.0 | — | 46 | 32 | 22 |
| H | 101 (14) | 311DQ (72) | 101 (14) | 25 | 30 | 149 | 136 | 25.0 | 23.0 | 90 | 90 | 90 |
| I | 101 (13) | 311DQ (73) | 101 (14) | 26 | 40 | 157 | 138 | 25.0 | 22.0 | — | — | 90 |
| J | 155 (12.5) | 17-7PH (75) | 155 (12.5) | | 30 | 155 | 150 | 27.0 | 22.0 | | | |

[1]Longitudinal in Dir. of Roll (comparable transverse 151-134, 155-137, 163-141)
[2]Longitudinal in Dir. of Roll (comparable transverse 123-100, 130-105, 144-116)

In each of these materials it is found that desirable stress remains in the temper rolled spring materials after long use at elevated temperatures. It is found that the spring characteristics of the electrically conductive metal laminate spring material of this invention is substantially improved over previously known copper-clad stainless steel spring materials. It is believed that the selected stainless steel materials are adapted to be strain hardened and dispersion strengthened in a selective or controlled manner for providing the laminate material with spring characteristics of improved strength and stability while also providing the necessary levels of electrical conductivity and formability for use in making formed electrically conductive spring solutionalizing and then selectively hardening the selected copper materials used in the laminates of this invention for further improving the strength and stability of the conductive spring laminates of this invention. In that way, the novel and improved conductive spring materials of this invention are adapted to serve as low cost substitutes for formed beryllium copper conductive contact spring members. They are also adapted to display some improvement in tensile strength over the previous materials and in preferred embodiments display substantially greater tensile strength and improved bending modulus of elasticity as compared to previously known copper-clad steel spring materials.

Comparable improvements were also observed in yield strength as indicated in Table III as well as in fatigue strength, isotropy, and ductility as compared to presently known composite metal conductive spring materials.

Figure 4:
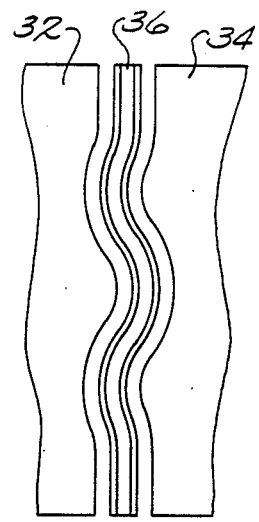
FIG. 4 is a diagrammatic view illustrating a step in forming novel and improved spring members of this invention.

Further when the laminate spring materials of the invention are formed as is diagrammatically indicated by the forming tools 32, 34 in FIG. 4, the resulting formed conductive spring member 36 is further found to further display the corresponding desired stability and strength without requiring any further heat treating after forming.

It should be understood that although particular embodiments of the novel and improved materials, members and method of this invention have been described by way of illustrating the invention, the invention includes all modifications and equivalents thereof falling within the scope of the appended claims.

What is claimed is:

1. A composite metal spring material comprising a layer of a copper metal selected from the group consisting of high conductivity copper and age and precipitation hardenable copper alloys metallurgically bonded to each side of a layer of austenitic stainless steel to form a symmetrical composite metal laminate, the laminate being selectively work-hardened for providing the laminate with selected resilience to form an electrically conductive spring material, characterized in that the material of the layer of copper metal comprises a material selected from the group consisting of high conductivity copper and age and precipitation hardenable copper alloys having nominal compositions by weight percent of 0.05 to 0.15 zirconium, 0.005 max. iron, 0.005 max. aluminum, 0.005 max. magnesium and the balance copper plus silver, the total of iron, aluminum and magnesium not exceeding 0.01 max., an alloy of 0.040 to 0.080 phosphorous, 0.080 to 0.130 magnesium, and the balance (at least 99.75 min.) copper plus silver with silver in the range from 0.27 to 0.100, an alloy of 0.025 to 0.040 phosphorous, 0.015 to 0.15 iron and the balance copper (plus silver), an alloy of 0.025 to 0.060 zirconium and the balance copper (plus silver), an alloy of 0.03 phosphorous, 0.007 iron, 0.005 zinc, and the balance copper (plus silver), and substantially pure copper having not more than 0.05 of other constituents therein, and in that the stainless steel layer of the spring material comprises a stainless steel alloy having a limited stabilizing dispersion therein selected from the group having nominal compositions by weight percent of 0.15 carbon max., 2.00 manganese max., 1.00 silicon max., 0.060 phosphorous max., 0.030 sulfur max., 17.5 to 17.8 chromium, 7.5 to 7.8 nickel and the balance iron, an alloy of 0.04 carbon man., 2.50 manganese max., 0.50 silicon max., 17.25 chromium, 4.5 nickel, 2.4 copper, and the balance iron, and an alloy of 0.09 carbon max., 1.00 manganese max., 1.00 silicon max., 0.040 phosphorous max., 0.030 sulfur max., 16.0 to 18.0 chromium, 6.50 to 7.75 nickel, 0.75 to 1.50 aluminum, and the balance iron, the stainless steel material being selectively strain hardened equal to about twenty-five to fifty percent of full work-hardening thereof and dispersion strengthened and in substantially fully solutionized condition except for said strain hardening and dispersion strengthening and being in selected thermally stress-relieved condition for providing the spring material with improved tensile strength of improved stability.

2. A composite metal spring material according to claim 1 further characterized in that the stainless steel layer of the spring material is in thermally stress-relieved condition for providing the spring material with improved tensile strength of improved stability in accordance with Table III.

3. An electrically conductive composite metal laminate spring member comprising a laminate material according to claim 2 in work-hardened condition for providing the laminate material with selected resilience, the laminate material being formed into selected shape for providing an electrically conductive spring member having selected shape characteristics.

* * * * *